United States Patent
Kobayashi et al.

(10) Patent No.: US 12,012,909 B2
(45) Date of Patent: Jun. 18, 2024

(54) INJECTOR CONTROL DEVICE

(71) Applicant: KUBOTA CORPORATION, Osaka (JP)

(72) Inventors: Yasushi Kobayashi, Sakai (JP); Shingo Matsunobu, Sakai (JP); Kiichi Suehiro, Sakai (JP); Naotaro Nagai, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/254,280

(22) PCT Filed: Feb. 21, 2022

(86) PCT No.: PCT/JP2022/007023
§ 371 (c)(1),
(2) Date: May 24, 2023

(87) PCT Pub. No.: WO2022/190842
PCT Pub. Date: Sep. 15, 2022

(65) Prior Publication Data
US 2024/0011449 A1    Jan. 11, 2024

(30) Foreign Application Priority Data
Mar. 9, 2021 (JP) .................. 2021-037802

(51) Int. Cl.
*F02D 41/40* (2006.01)
(52) U.S. Cl.
CPC .................. *F02D 41/402* (2013.01)

(58) Field of Classification Search
CPC ................................................ F02D 41/402
(Continued)

(56) References Cited

U.S. PATENT DOCUMENTS

2017/0218876 A1 * 8/2017 Kusakabe ............... F02D 41/34

FOREIGN PATENT DOCUMENTS

JP     H11-82183 A     3/1999
JP     2001-032738 A   2/2001
(Continued)

*Primary Examiner* — Lindsay M Low
*Assistant Examiner* — Omar Morales
(74) *Attorney, Agent, or Firm* — Muncy, Geissler, Olds & Lowe, P.C.

(57) ABSTRACT

Provided is an injector control device which is capable of setting a preceding injection amount to a fuel injection amount that is less than a main injection amount, while suppressing situations where preceding injections executed prior to a main injection in multi-stage injection are eliminated.

An injector control device 2 includes: an injection amount setting unit 211 that sets, as a total injection amount, a total of fuel injection amounts in multi-stage injection in a single cycle, and sets, as a preceding injection amount, a fuel injection amount in a preceding injection executed prior to a main injection in the multi-stage injection; an energization period setting unit 212 that sets an energization period of an injector 31 based on the fuel injection amounts set by the injection amount setting unit 211; and an injector driving unit 213 that controls driving of the injector 31 based on the energization period set by the energization period setting unit 212. The injection amount setting unit 211 sets a fuel injection amount that is a predetermined percentage of the total injection amount as the preceding injection amount.

5 Claims, 4 Drawing Sheets

(58) Field of Classification Search
USPC .......................................................... 123/472
See application file for complete search history.

(56) References Cited

FOREIGN PATENT DOCUMENTS

| | | |
|---|---|---|
| JP | 2001-82213 A | 3/2001 |
| JP | 2017-129066 A | 7/2017 |

\* cited by examiner

FIG. 6

INJECTOR CONTROL DEVICE

TECHNICAL FIELD

The present invention relates to an injector control device that controls driving of an injector that injects fuel.

BACKGROUND ART

In diesel engines, for example, multi-stage injection, in which fuel injection is divided into multiple instances during a single cycle, is sometimes performed to reduce noise or the like. In this case, control is generally performed such that absolute values of fuel injection amounts are designated for a total injection amount, which corresponds to the total fuel injection amount in the multi-stage injection during the single cycle, and for a preceding injection amount, which corresponds to the fuel injection amount of preceding injection performed prior to the main injection of the multi-stage injection, such as pilot injection or pre-injection. At this time, a guaranteed minimum injection amount of, for example, about 2 mm$^3$/stroke (st) is set, taking into account individual differences between injectors, individual differences between electronic control units (ECUs), and the like.

Here, in a low-displacement engine (e.g., less than 1,000 cc), in which the total injection amount when idling (i.e., an idle injection amount) is set to a minute injection amount of about 6 mm$^3$/st or less, the preceding injection amount may become greater than or equal to the main injection amount if the absolute value of the guaranteed minimum injection amount, e.g., about 2 mm$^3$/st, is designated as the preceding injection amount. For example, when the idle injection amount is designated as an absolute value of 3 mm$^3$/st and the preceding injection amount is designated as an absolute value of 2 mm$^3$/st, the main injection amount is set to 1 mm$^3$/st. If this is the case, there is a problem in that the preceding injection amount exceeds the main injection amount, resulting in abnormal combustion.

PTL 1 discloses a fuel injection control device including an injection amount setting changing unit. When the main injection amount is less than a predetermined injection amount and the pilot injection amount exceeds the predetermined injection amount, the injection amount setting changing unit described in PTL 1 changes the value of the main injection amount to the predetermined injection amount, and changes the value of the pilot injection amount to a value obtained by subtracting the post-change main injection amount from the total injection amount. Accordingly, when the fuel injection control device described in PTL 1 is applied in a low-displacement engine as described above, the pilot injection amount may be set to less than or equal to the guaranteed minimum injection amount. However, depending on individual differences between injectors and individual differences between ECUs, doing so may eliminate the pilot injection and result in a reduced noise reduction effect.

Meanwhile, when the main injection amount is less than the predetermined injection amount and the pilot injection amount is less than the predetermined injection amount, the injection amount setting changing unit described in PTL 1 changes the value of the main injection amount to the total injection amount. However, there is a problem in that doing so eliminates the pilot injection and results in a reduced noise reduction effect.

CITATION LIST

Patent Literature

[PTL 1] Japanese Patent Application Publication No. 2017-129066

SUMMARY OF INVENTION

Technical Problem

Having been conceived in order to solve such problems, an object of the present invention is to provide an injector control device capable of setting a preceding injection amount to a fuel injection amount that is less than a main injection amount, while suppressing situations where preceding injections executed prior to a main injection in multi-stage injection are eliminated.

Solution to Problem

The above-described problem is solved by an injector control device according to the present invention. The injector control device controls driving of an injector that performs multi-stage injection in which fuel injection is divided into a plurality of injections in a single cycle, and includes: an injection amount setting unit that sets, as a total injection amount, a total of fuel injection amounts in the multi-stage injection in the single cycle, and sets, as a preceding injection amount, a fuel injection amount in a preceding injection executed prior to a main injection in the multi-stage injection; an energization period setting unit that sets an energization period of the injector based on the fuel injection amounts set by the injection amount setting unit; and an injector driving unit that controls driving of the injector based on the energization period set by the energization period setting unit. The injection amount setting unit sets a fuel injection amount that is a predetermined percentage of the total injection amount as the preceding injection amount.

In the injector control device according to the present invention, the injection amount setting unit sets, as a total injection amount, a total of fuel injection amounts in the multi-stage injection in the single cycle, and sets, as a preceding injection amount, a fuel injection amount in a preceding injection executed prior to a main injection in the multi-stage injection. At this time, the injection amount setting unit sets a fuel injection amount that is a predetermined percentage of the total injection amount as the preceding injection amount, rather than an absolute value of a fuel injection amount. In other words, the injector control device according to the present invention executes control for designating the preceding injection amount as a percentage of the total injection amount, rather than control for designating the preceding injection amount as an absolute value. As such, the injector control device according to the present invention can set the preceding injection amount to a fuel injection amount that is less than the main injection amount, while suppressing situations where preceding injections executed prior to the main injection in multi-stage injection are eliminated.

Additionally, because the injection amount setting unit sets a fuel injection amount that is a predetermined percentage of the total injection amount as the preceding injection amount, the percentage of the total injection amount which the preceding injection amount is stays the same regardless of individual differences between injectors, individual differences between ECUs, and the like. Through this, the injector control device according to the present invention can maintain an effect of reducing noise through multi-stage injection regardless of individual differences between injectors, individual differences between ECUs, and the like.

Preferably, the injector control device according to the present invention further includes a minute injection amount region determination unit that determines whether the total injection amount is within a minute injection amount region, and when the minute injection amount region determination unit determines that the total injection amount is within the minute injection amount region, the injection amount setting unit sets, as the preceding injection amount, the fuel injection amount that is the predetermined percentage of the total injection amount.

With the injector control device according to the present invention, the minute injection amount region determination unit determines whether the total injection amount is within a minute injection amount region. When the minute injection amount region determination unit determines that the total injection amount is within the minute injection amount region, the injection amount setting unit sets, as the preceding injection amount, the fuel injection amount that is the predetermined percentage of the total injection amount. As such, even in a low-displacement engine in which the total injection amount is set to the minute injection amount, the injector control device according to the present invention can set the preceding injection amount to a fuel injection amount that is less than the main injection amount, while suppressing situations where preceding injections executed prior to the main injection in multi-stage injection are eliminated.

Preferably, in the injector control device according to the present invention, when the minute injection amount region determination unit determines that the total injection amount is not within the minute injection amount region, the injection amount setting unit sets, as the preceding injection amount, a predetermined fuel injection amount set in advance.

With the injector control device according to the present invention, when the minute injection amount region determination unit determines that the total injection amount is not within the minute injection amount region, the injection amount setting unit sets, as the preceding injection amount, the predetermined fuel injection amount set in advance. Accordingly, when the minute injection amount region determination unit determines that the total injection amount is not within the minute injection amount region, the injection amount setting unit sets an absolute value of a fuel injection amount as the preceding injection amount. Through this, the injector control device according to the present invention can suppress excessive preceding injection amounts when the total injection amount is outside the minute injection amount region, such as a high injection amount region or the like, for example.

Advantageous Effects of Invention

According to the present invention, an injector control device can be provided which is capable of setting a preceding injection amount to a fuel injection amount that is less than a main injection amount, while suppressing situations where preceding injections executed prior to a main injection in multi-stage injection are eliminated.

DESCRIPTION OF EMBODIMENTS

A preferred embodiment of the present invention will be described in detail hereinafter with reference to the drawings.

The embodiment described hereinafter is a specific preferred example of the present invention and therefore has various limitations which are favorable from a technical perspective, but it should be noted that the scope of the present invention is not intended to be limited to this embodiment unless such limitations are explicitly mentioned hereinafter. Furthermore, in each of the drawings, the same reference signs will be assigned to the same constituent elements, and detailed descriptions thereof will be omitted as appropriate.

Figure 1:
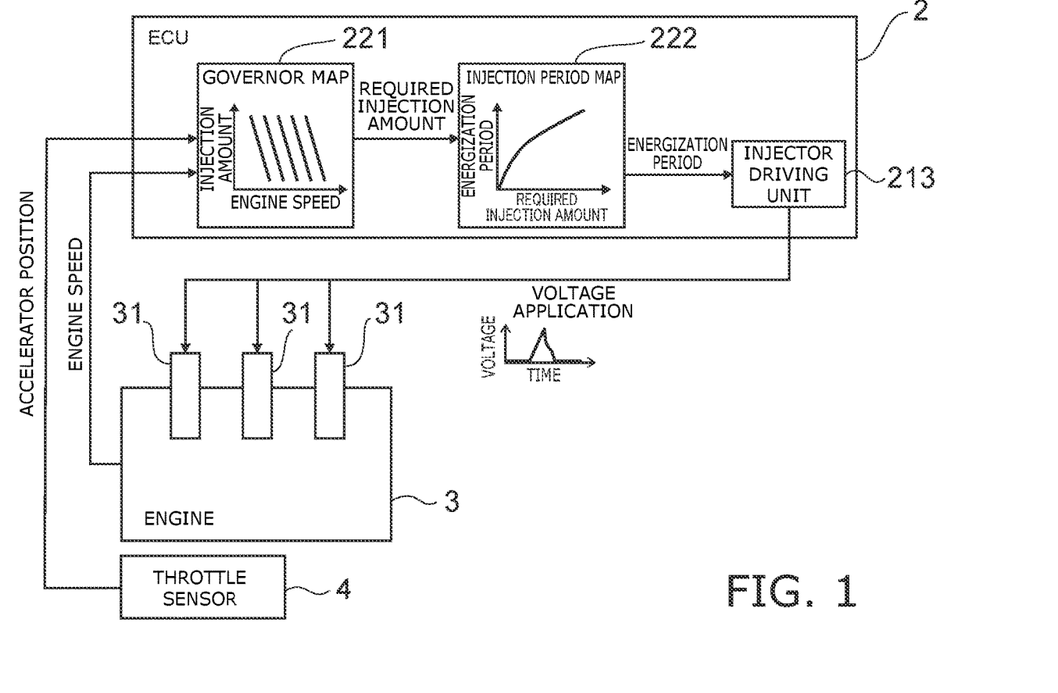
FIG. 1 is a block diagram illustrating an overview of an injector control device according to the present invention.

FIG. 1 is a block diagram illustrating an overview of an injector control device according to the present invention.

Figure 2:
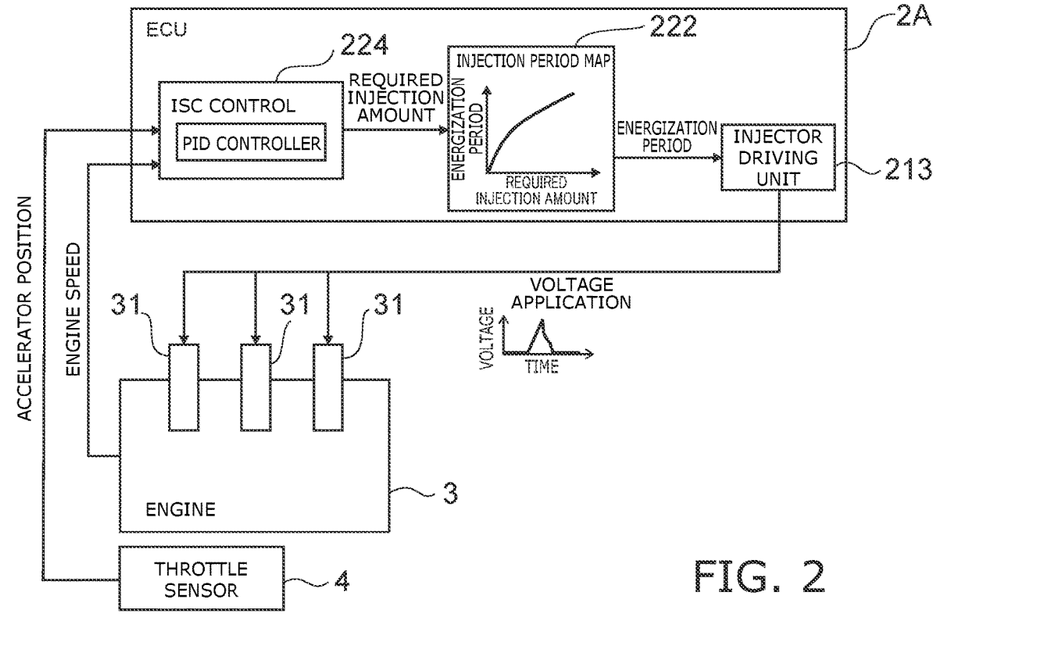
FIG. 2 is a block diagram illustrating an overview of an injector control device according to a variation of the present invention.

FIG. 2 is a block diagram illustrating an overview of an injector control device according to a variation of the present invention.

Injector control devices 2 and 2A according to the present embodiment are installed in an engine 3 of an industrial machine, for example, and control the driving of injectors 31 that inject fuel. As illustrated in FIGS. 1 and 2, the injector control devices 2 and 2A according to the present embodiment function as part of an electronic control unit (ECU). Note that in the examples illustrated in FIGS. 1 and 2, three injectors 31 are provided in the engine 3. However, the number of injectors 31 installed is not limited to three.

The injector control device 2 illustrated in FIG. 1 has a governor map 221, an injection period map 222, and an injector driving unit 213. As will be described later, the governor map 221 and the injection period map 222 are held (stored) in a storage unit 22 (see FIG. 3). As illustrated in FIG. 1, a detection signal pertaining to the engine speed is input to the injector control device 2 from the engine 3. Meanwhile, a detection signal pertaining to an accelerator position is input to the injector control device 2 from a throttle sensor 4.

Based on the detection signal pertaining to the engine speed sent from the engine 3 and the detection signal pertaining to the accelerator position sent from the throttle sensor 4, the injector control device 2 illustrated in FIG. 1 sets a required injection amount of fuel using the governor map 221. In other words, using the governor map 221, the injector control device 2 executes control such that the engine speed is in proportion to the load on the engine 3 (governor control). For example, if the engine speed drops but the accelerator position stays constant, the injector control device 2 executes control for increasing the required injection amount. On the other hand, for example, if the engine speed rises but the accelerator position stays constant, the injector control device 2 executes control for reducing the required injection amount.

Note that the injector control device 2A may set the required injection amount of fuel by executing ISC control (idle speed control) 224 instead of setting the required injection amount of fuel using the governor map 221, as is the case with the injector control device 2A illustrated in FIG. 2. For example, in ISC control, the injector control device 2A executes PID feedback control such that the engine speed takes on a predetermined value.

For the sake of simplicity, the injector control device 2 illustrated in FIG. 1 will be used as an example in the following descriptions.

Next, based on the required injection amount set using the governor map 221, the injector control device 2 sets an energization period (i.e., an energization time) of the injectors 31 using the injection period map 222.

The injector driving unit 213 then controls the driving of the injectors 31 based on the energization period of the injectors 31 set using the injection period map 222. For example, the injector driving unit 213 supplies boost voltage generated by a booster circuit (not shown) (i.e., a charge voltage from a capacitor), a voltage supplied from a battery (not shown), or the like to solenoid coils of the injectors 31. This opens needle valves of the injectors 31 and starts fuel injection. Then, when the energization period of the injectors 31 set using the injection period map 222 has elapsed following the point at which the energization of the injectors 31 began (i.e., the point in time when the supply of voltage to the injectors 31 began), the injector driving unit 213 stops the supply of voltage to the solenoid coils of the injectors 31. This closes the needle valves of the injectors 31 and stops fuel injection.

Additionally, the injector driving unit 213 controls the driving of the injectors 31 to perform multi-stage injection in which the fuel injection is divided into multiple instances during a single cycle, for the purpose of reducing noise and the like in the engine 3. For example, in a single cycle, each injector 31 performs a main injection, as well as a pre-injection, in which fuel at an injection amount less than the injection amount of the main injection is injected before the main injection. The pre-injection of the present embodiment is an example of "preceding injection" of the present invention. Note that the fuel injections performed by the injector 31 during a single cycle are not limited to the main injection and the pre-injection. For example, in a single cycle, each injector 31 may perform a main injection, as well as a pilot injection, in which fuel at an injection amount less than the injection amount of the main injection is injected before the main injection. The pilot injection of the present embodiment is an example of "preceding injection" of the present invention. Alternatively, the injector 31 may perform the pilot injection and the pre-injection in that order before the main injection in a single cycle. In other words, the "preceding injection" of the present invention includes at least one of the pilot injection and the pre-injection of the present embodiment. Alternatively, the injector 31 may perform an after-injection and a post-injection in that order after the main injection in a single cycle.

The following will describe a case where the main injection and pre-injection are performed by the injector 31 as an example, for the sake of simplicity.

As described above, the injector driving unit 213 controls the driving of the injectors 31 such that multi-stage injection is performed. Accordingly, using the governor map, the injector control device 2 sets the total fuel injection amount in the multi-stage injection for a single cycle as the total injection amount. In the present embodiment, the total injection amount is a fuel injection amount obtained by adding the main injection amount, corresponding to the fuel injection amount in the main injection, with the pre-injection amount, corresponding to the fuel injection amount in the pre-injection. The pre-injection amount of the present embodiment is an example of a "preceding injection amount" of the present invention. When, for example, the injector 31 performs main injection and pilot injection, the total injection amount is a fuel injection amount obtained by adding the main injection amount, corresponding to the fuel injection amount in the main injection, with the pilot injection amount, corresponding to the fuel injection amount in the pilot injection. The pilot injection amount is an example of a "preceding injection amount" of the present invention. Additionally, when, for example, the injector 31 performs main injection, pre-injection, and pilot injection, the total injection amount is a fuel injection amount obtained by adding the main injection amount, the pre-injection amount, and the pilot injection amount.

The injector control device 2 according to the present embodiment will be described in detail next with reference to the drawings.

Figure 3:
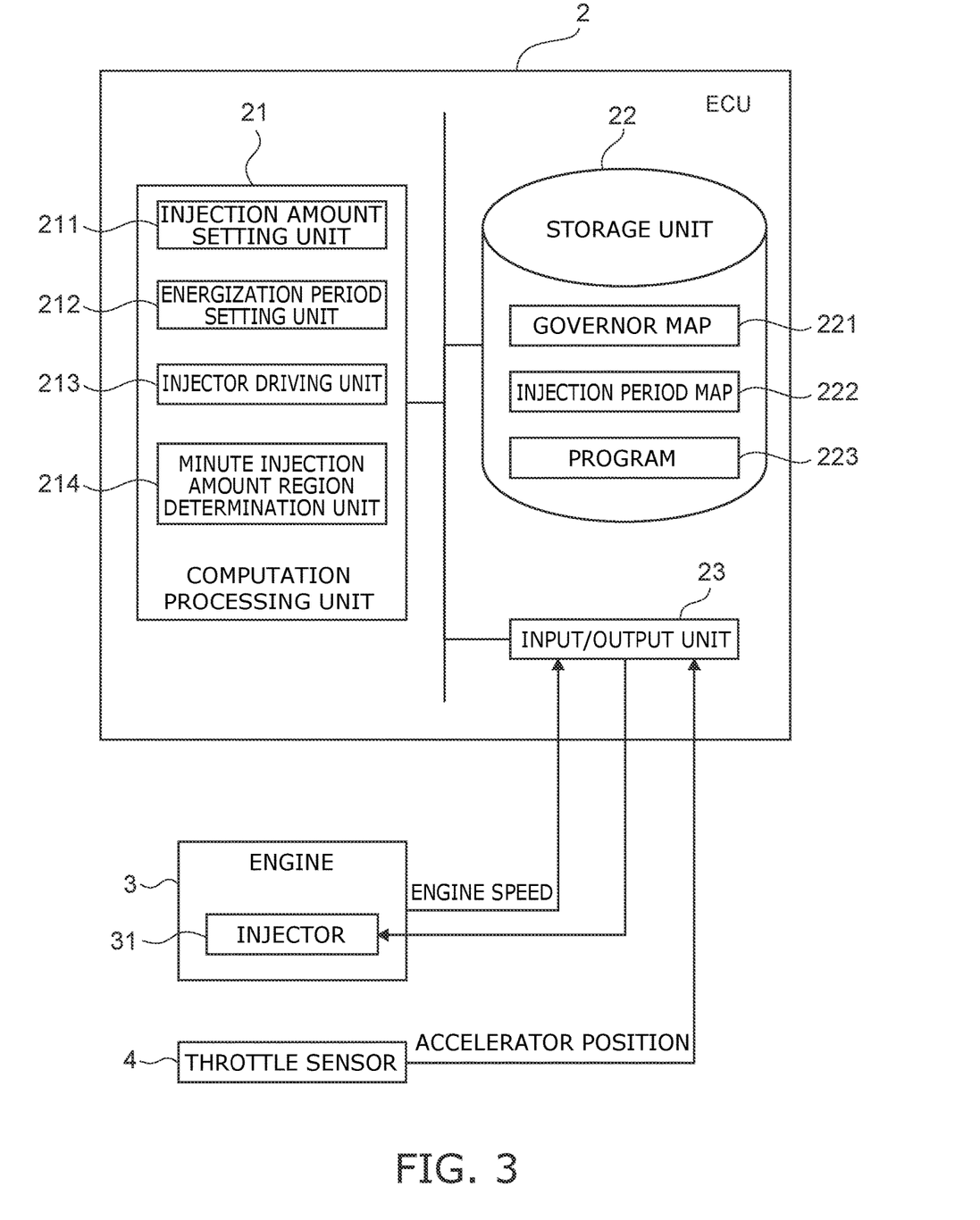
FIG. 3 is a block diagram illustrating the primary configuration of an injector control device according to an embodiment.

FIG. 3 is a block diagram illustrating the primary configuration of the injector control device according to the present embodiment.

As illustrated in FIG. 3, the injector control device 2 according to the present embodiment includes a computation processing unit 21, a storage unit 22, and an input/output unit 23.

The computation processing unit 21 has the functions of a central processing unit (CPU), reads out a program 223 stored in the storage unit 22, and executes various types of computations, processing, and the like. The computation processing unit 21 includes an injection amount setting unit 211, an energization period setting unit 212, the injector driving unit 213, and a minute injection amount region determination unit 214. The injection amount setting unit 211, the energization period setting unit 212, the injector driving unit 213, and the minute injection amount region determination unit 214 are realized by the computation processing unit 21 executing the program 223 held (stored) in the storage unit 22. Note that the injection amount setting unit 211, the energization period setting unit 212, the injector driving unit 213, and the minute injection amount region determination unit 214 may be realized by hardware, or may be realized by a combination of hardware and software.

The injection amount setting unit 211 sets the total fuel injection amount of the multi-stage injection in a single cycle as the total injection amount, using the governor map 221 stored in the storage unit 22. Additionally, the injection amount setting unit 211 sets the fuel injection amount in the preceding injection executed prior to the main injection in the multi-stage injection (the pre-injection, in the present embodiment) as the preceding injection amount (the pre-injection amount, in the present embodiment). The processes in which the injection amount setting unit 211 sets the pre-injection amount will be described in detail later.

The energization period setting unit 212 sets the energization period of the injectors 31 based on the fuel injection amount set by the injection amount setting unit 211. Specifically, as described above with reference to FIG. 1, the energization period setting unit 212 sets the energization period (i.e., the energization time) of the injectors 31 using the injection period map 222 held in the storage unit 22, based on the required injection amount set by the injection amount setting unit 211 using the governor map 221.

Based on the energization period of the injectors 31, set by the energization period setting unit 212 using the injection period map 222, the injector driving unit 213 sends control signals to the injectors 31 through the input/output unit 23 and controls the driving of the injectors 31. As described earlier with reference to FIG. 1, the injector driving unit 213 supplies boost voltage generated by a booster circuit, voltage supplied from a battery, or the like to the injectors 31 through the input/output unit 23. This opens needle valves of the injectors 31 and starts fuel injection. The injector driving unit 213 then stops the supply of voltage to the injectors 31 when the energization period of the injectors 31, which has been set by the energization period setting unit 212, has elapsed after the point in time when the supply of the voltage to the injectors 31 began. This closes the needle valves of the injectors 31 and stops fuel injection.

The minute injection amount region determination unit 214 determines whether the total injection amount, corresponding to the total fuel injection amount of multi-stage injection in a single cycle, is within a minute injection amount region. For example, the minute injection amount region determination unit 214 determines that the total injection amount is within the minute injection amount region when the total injection amount is less than or equal to a predetermined fuel injection amount. The predetermined fuel injection amount is about 6 $mm^3$/st, for example. However, the predetermined fuel injection amount is not limited to 6 $mm^3$/st. Alternatively, the minute injection amount region determination unit 214 may determine whether the total injection amount is within the minute injection amount region based not only on the total injection amount, but based on both the total injection amount and the engine speed. For example, the minute injection amount region determination unit 214 may determine that the total injection amount is within the minute injection amount region when the engine speed received from the engine 3 through the input/output unit 23 is less than or equal to a predetermined speed and the total injection amount is less than or equal to the predetermined fuel injection amount. The predetermined speed is, for example, about 2,400 rpm. However, the predetermined speed is not limited to 2,400 rpm.

The storage unit 22 holds (stores) the governor map 221, the injection period map 222, and the program 223. A ROM (Read Only Memory), a RAM (Random Access Memory), and the like can be given as examples of the storage unit 22. Note that the storage unit 22 may be an external storage device connected to the injector control device 2.

The governor map 221 includes a distribution diagram illustrating the relationship between the engine speed and the fuel injection amount (i.e., the required injection amount), as illustrated in FIG. 1. Note that the governor map 221 may be formulas, a table, or the like indicating the relationship between the engine speed and the fuel injection amount.

The injection period map 222 includes a distribution diagram illustrating the relationship between the fuel injection amount (i.e., the required injection amount) and the energization period of the injectors 31, as illustrated in FIG. 1. Note that the injection period map 222 may be formulas, a table, or the like indicating the relationship between the fuel injection amount and the energization period of the injectors 31.

The program 223 includes a sequence program, a computation program, and the like for setting the fuel injection amount (i.e., the required injection amount) and the energization period of the injectors 31.

Operations of the injector control device 2 according to the present embodiment will be described in detail next with reference to the drawings.

Figure 4:
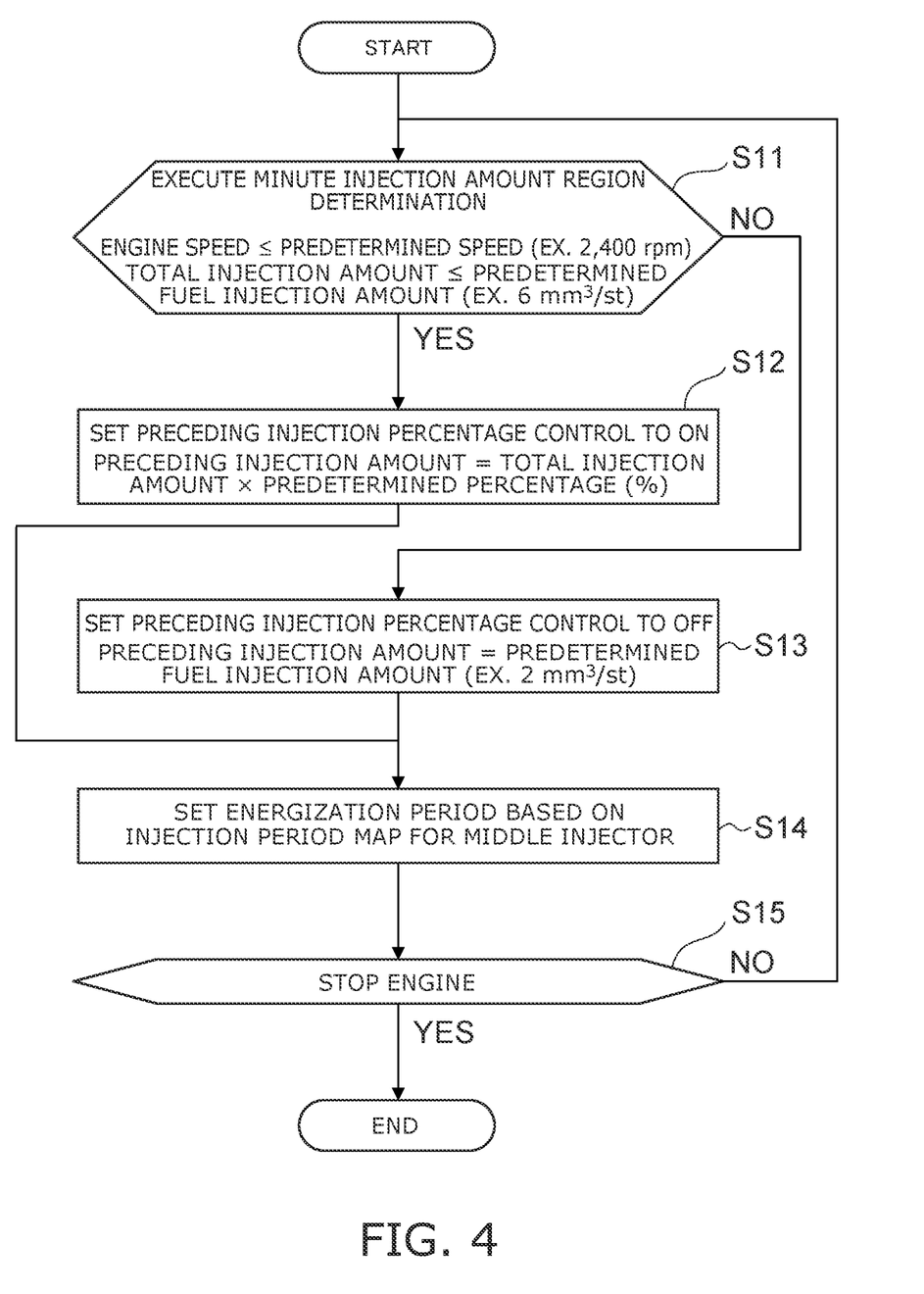
FIG. 4 is a flowchart illustrating an example of operations performed by an injector control device according to an embodiment.

FIG. 4 is a flowchart illustrating an example of operations performed by the injector control device according to the present embodiment.

Figure 5:
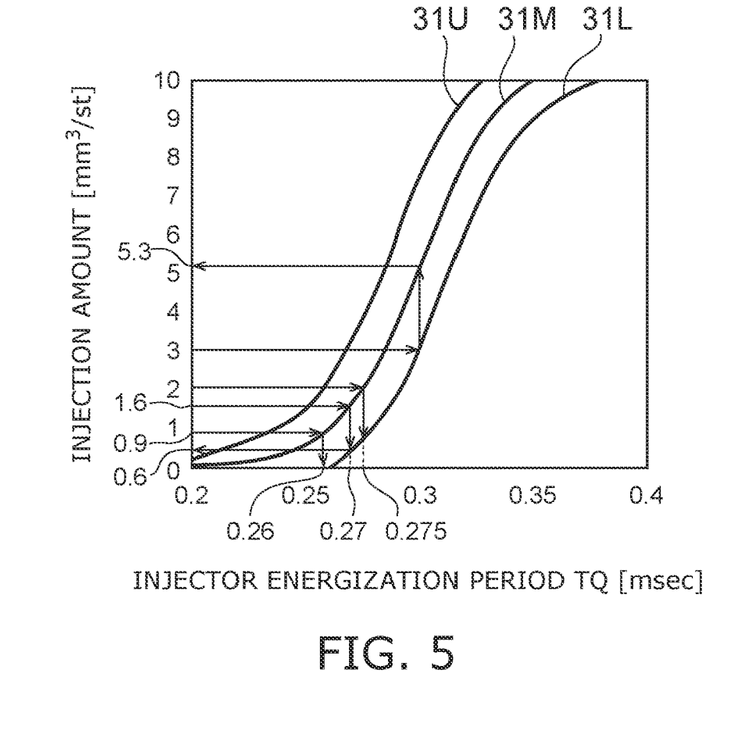
FIG. 5 is a graph illustrating an example of a relationship between an injector energization period and a fuel injection amount.

FIG. 5 is a graph illustrating an example of a relationship between the injector energization period and the fuel injection amount.

First, in a low-displacement engine (e.g., less than 1,000 cc), in which the total injection amount when idling (i.e., an idle injection amount) is set to a minute injection amount of, for example, about 6 $mm^3$/st or less, the pre-injection amount may become greater than or equal to the main injection amount if the absolute value of the guaranteed minimum injection amount of the injector (e.g., about 2 $mm^3$/st) is designated as the pre-injection amount. For example, when the total injection amount is designated as an absolute value of 3 $mm^3$/st and the pre-injection amount is designated as an absolute value of 2 $mm^3$/st, the main injection amount is set to 1 $mm^3$/st. If this is the case, the pre-injection amount exceeds the main injection amount, resulting in abnormal combustion.

Additionally, if the pre-injection amount is designated as an absolute value less than or equal to the guaranteed minimum injection amount (e.g., about 0.9 $mm^3$/st), the pre-injection may be eliminated and the noise reduction effect may decrease, depending on individual differences between injectors.

This will be explained in further detail. Individual differences are present from injector to injector. Individual differences between injectors are caused by variations in the production of the injector and other factors. For example, the diameter of the injector nozzle hole varies from injector to injector due to manufacturing variations. Accordingly, even if the same injector energization period is set, as per the graph illustrated in FIG. 5, for example, the injection amount of fuel injected from the nozzle hole of the injector will vary from injector to injector. Accordingly, in the present embodiment, of the plurality of injectors manufactured, the injector having the highest fuel injection amount in a predetermined energization period will be called an "upper limit injector 31U". Additionally, of the plurality of injectors manufactured, the injector having a median fuel injection amount in the predetermined energization period will be called a "middle injector 31M". Furthermore, of the plurality of injectors manufactured, the injector having the lowest fuel injection amount in the predetermined energization period will be called a "lower limit injector 31L".

Here, a case where the injection amount setting unit 211 sets the total injection amount of the middle injector 31M to 3 $mm^3$/st using the governor map 221 will be described as an example. Furthermore, a case where the injection period map 222 includes a distribution diagram illustrating a relationship between the fuel injection amount (i.e., the required injection amount) of the middle injector 31M and the energization period of the injector 31 will be described as an example.

In this case, when the injection amount setting unit 211 designates the pre-injection amount as an absolute value of $mm^3$/st, the energization period setting unit 212 sets the energization period of the injectors 31 to 0.26 msec using the injection period map 222, as illustrated in FIG. 5. However, when the lower limit injector 31L is installed in the engine 3, this results in the fuel injection amount of the lower limit injector 31L dropping to zero. Accordingly, when the lower limit injector 31L is installed in the engine 3, the pre-injection is eliminated. In this manner, the injector control device 2 cannot determine whether the injector 31 installed in the engine 3 is the upper limit injector 31U, the middle injector 31M, or the lower limit injector 31L, and thus the pre-injection may be eliminated if the injection amount setting unit 211 designates an absolute value for the pre-injection amount.

As opposed to this, the injection amount setting unit 211 of the injector control device 2 according to the present embodiment sets a fuel injection amount that is a predetermined percentage of the total injection amount as the pre-injection amount. This will be described in detail with reference to FIGS. 4 and 5.

First, in step S11, the minute injection amount region determination unit 214 executes minute injection amount region determination, and determines whether the total injection amount is within the minute injection amount region. In the example in FIG. 4, the minute injection amount region determination unit 214 determines whether the engine speed received from the engine 3 through the input/output unit 23 is less than or equal to a predetermined speed (e.g., 2,400 rpm) and the total injection amount is less than or equal to a predetermined fuel injection amount (e.g., 6 mm$^3$/st).

If it is determined that the conditions for determining that the engine speed received from the engine 3 through the input/output unit 23 is less than or equal to the predetermined speed (e.g., 2,400 rpm) and the total injection amount is less than or equal to a predetermined fuel injection amount (e.g., 6 mm$^3$/st) are met (step S11: YES), in step S12, the computation processing unit 21 sets preceding injection (pre-injection, in the present embodiment) percentage control to "on". Accordingly, the injection amount setting unit 211 sets a fuel injection amount that is a predetermined percentage (%) of the total injection amount as the preceding injection amount (the pre-injection amount, in the present embodiment).

Here, as described above, a case where the injection amount setting unit 211 sets the total injection amount of the middle injector 31M to 3 mm$^3$/st using the governor map 221 will be described as an example. Also as described above, a case where the injection period map 222 includes a distribution diagram illustrating a relationship between the fuel injection amount (i.e., the required injection amount) of the middle injector 31M and the energization period of the injector 31 will be described as an example. Furthermore, a case where the predetermined percentage is 30%, i.e., a case where the injection amount setting unit 211 sets a fuel injection amount of 30% of the total injection amount as the pre-injection amount, will be described as an example.

In this case, when the middle injector 31M is installed in the engine 3, the injection amount setting unit 211 sets 0.9 mm$^3$/st (=3 mm$^3$/st×30%) as the pre-injection amount in step S12. Next, in step S14, as illustrated in FIG. 5, the energization period setting unit 212 sets the energization period of the injectors 31 to 0.26 msec using the injection period map 222. In this case, the middle injector 31M is installed in the engine 3, and thus the pre-injection amount of the middle injector 31M is 0.9 mm$^3$/st.

On the other hand, when the lower limit injector 31L is installed in the engine 3, the total injection amount, corresponding to the fuel injection amount obtained by adding the main injection amount and the pre-injection amount, is reduced, and thus the engine speed begins to drop. As a result, the injection amount setting unit 211 executes governor control and increases the fuel injection amount (i.e., the required injection amount) using the governor map 221 to keep the engine speed constant. Through this, the injection amount setting unit 211 sets the fuel injection amount (i.e., the required injection amount) to 5.3 mm$^3$/st, such that the total injection amount of the lower limit injector 31L is 3 mm$^3$/st, as illustrated in FIG. 5. Then, in step S12, the injection amount setting unit 211 sets the pre-injection amount to 1.6 mm$^3$/st (≈5.3 mm$^3$/st×30%).

Upon doing so, in step S14, as illustrated in FIG. 5, the energization period setting unit 212 sets the energization period of the injectors 31 to 0.27 msec using the injection period map 222. In this case, the lower limit injector 31L is installed in the engine 3, and thus the pre-injection amount of the lower limit injector 31L becomes 0.6 mm$^3$/st. Accordingly, even if the lower limit injector 31L is installed in the engine 3, the pre-injection is not eliminated.

If it is determined that the conditions for determining that the engine speed received from the engine 3 through the input/output unit 23 is less than or equal to the predetermined speed (e.g., 2,400 rpm) and the total injection amount is less than or equal to a predetermined fuel injection amount (e.g., 6 mm$^3$/st) are not met (step S11: NO), in step S13, the computation processing unit 21 sets preceding injection (pre-injection, in the present embodiment) percentage control to "off". Accordingly, the injection amount setting unit 211 sets the preceding injection amount (the pre-injection amount, in the present embodiment) to the absolute value of a predetermined fuel injection amount (e.g., 2 mm$^3$/st). Next, in step S14, as illustrated in FIG. 5, the energization period setting unit 212 sets the energization period of the injectors 31 to 0.275 msec using the injection period map 222. In this case, the total injection amount is not within the minute injection amount region, and thus a pre-injection amount greater than or equal to the guaranteed minimum injection amount (e.g., 2 mm$^3$/st) is secured. Accordingly, even if the lower limit injector 31L is installed in the engine 3, the pre-injection is not eliminated.

Next, in step S15, the computation processing unit 21 determines whether to stop the engine 3. When the engine 3 is to be stopped (step S15: YES), the injector control device 2 stops operation. On the other hand, when the engine 3 is not to be stopped (step S15: NO), in step S11, the minute injection amount region determination unit 214 executes minute injection amount region determination, and determines whether the total injection amount is within the minute injection amount region.

With the injector control device 2 according to the present embodiment, the injection amount setting unit 211 sets a fuel injection amount that is a predetermined percentage of the total injection amount, rather than an absolute value of a fuel injection amount, as the pre-injection amount. In other words, the injector control device 2 according to the present embodiment executes control that designates the pre-injection amount as a percentage of the total injection amount, rather than control that designates an absolute value for the pre-injection amount. As such, the injector control device 2 according to the present embodiment can set the pre-injection amount to a fuel injection amount that is less than a main injection amount, while suppressing situations where pre-injections executed prior to the main injection in multistage injection are eliminated.

Additionally, because the injection amount setting unit 211 sets a fuel injection amount that is a predetermined percentage of the total injection amount as the pre-injection amount, the percentage of the total injection amount which the pre-injection amount is stays the same regardless of individual differences between the injectors 31, individual differences between the ECUs, and the like. Through this, the injector control device 2 according to the present embodiment can maintain the effect of reducing noise through multi-stage injection regardless of individual differences between the injectors 31, individual differences between the ECUs, and the like.

Additionally, the minute injection amount region determination unit 214 determines whether the total injection amount is within the minute injection amount region. When the minute injection amount region determination unit 214 determines that the total injection amount is within the minute injection amount region, the injection amount setting unit 211 sets a fuel injection amount that is a predetermined percentage of the total injection amount as the pre-injection amount. As such, even in a low-displacement engine 3 (e.g., less than 1,000 cc), in which the total injection amount is set to a minute injection amount (i.e., about 6 mm$^3$/st or less), the injector control device 2 according to the present embodiment can set the pre-injection amount to a fuel injection amount that is less than a main injection amount, while suppressing situations where pre-injections executed prior to the main injection in multi-stage injection are eliminated.

On the other hand, when the minute injection amount region determination unit 214 determines that the total injection amount is not within the minute injection amount region, the injection amount setting unit 211 sets a predetermined fuel injection amount set in advance as the pre-injection amount. Accordingly, when the minute injection amount region determination unit 214 determines that the total injection amount is not within the minute injection amount region, the injection amount setting unit 211 sets an absolute value of a fuel injection amount as the pre-injection amount. Through this, the injector control device 2 according to the present embodiment can suppress excessive pre-injection amounts when the total injection amount is outside the minute injection amount region, such as a high injection amount region or the like, for example.

Figure 6:
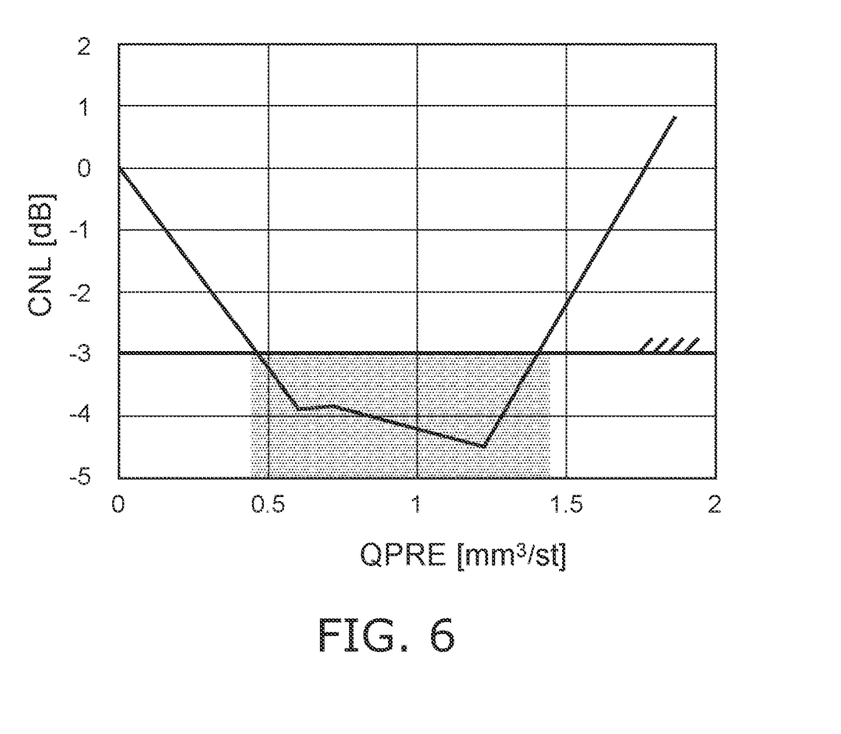
FIG. 6 is a graph illustrating an example of a result of a study carried out by the inventors of the present invention.

FIG. 6 is a graph illustrating an example of a result of a study carried out by the inventors of the present invention.

The inventors of the present invention conducted a study on the relationship between the pre-injection amount (QPRE) and a combustion noise level (CNL) by taking actual measurements under the following operating conditions. [Engine Operating Conditions]
 (1) Engine speed: 1,300 rpm (a no-load state)
 (2) Actual injection amount (corresponding to the "total injection amount" in the present embodiment): 3.7 mm$^3$/st
 (3) Multi-stage injection time interval: 2.3 msec The graph in FIG. 6 shows an example of the results of the study. That is, when the pre-injection amount is 1.0 mm$^3$/st±0.5 mm$^3$/st, the combustion noise level can be reduced by 4 dB relative to the combustion noise level when the pre-injection amount is zero (when pre-injection is not performed). This indicates that even when the pre-injection amount of the lower limit injector 31L is 0.6 mm$^3$/st, as described by way of example with reference to FIGS. 4 and 5, the combustion noise level can be reduced by 4 dB relative to the combustion noise level when the pre-injection amount is zero.

An embodiment of the present invention has been described thus far. However, the present invention is not limited to the above-described embodiment, and various modifications can be made without departing from the scope of the patent claims. The configurations in the above-described embodiment can be partially omitted or combined as desired in different ways from those described above.

REFERENCE SIGNS LIST

2, 2A Injector control device
3 Engine
4 Throttle sensor
21 Computation processing unit
22 Storage unit
23 Input/output unit
31 Injector
31L Lower limit injector
31M Middle injector
31U Upper limit injector
211 Injection amount setting unit
212 Energization period setting unit
213 Injector driving unit
214 Minute injection amount region determination unit
221 Governor map
222 Injection period map
223 Program
224 ISC control

The invention claimed is:

1. An injector control device that controls driving of an injector that performs multi-stage injection in which fuel injection is divided into a plurality of injections in a single cycle of an engine, the injector control device comprising:
 an injection amount setting unit that sets, as a total injection amount, a total of fuel injection amounts in the multi-stage injection in the single cycle, and sets, as a preceding injection amount, a fuel injection amount in a preceding injection executed prior to a main injection in the multi-stage injection;
 an energization period setting unit that sets an energization period of the injector based on the total injection amount and the preceding injection amount set by the injection amount setting unit;
 an injector driving unit that controls driving of the injector based on the energization period set by the energization period setting unit, and
 a minute injection amount region determination unit that determines whether the total injection amount is within a minute injection amount region,
 wherein the injection amount setting unit executes control such that an engine speed of the engine is in proportion to the load on the engine, in the control that if the engine speed drops the injection amount setting unit executes control for increasing the total injection amount and if the engine speed rises the injection amount setting unit executes control for reducing the total injection amount, sets the total injection amount for keeping the engine speed constant, and sets a fuel injection amount that is a predetermined percentage of the total injection amount as the preceding injection amount when the minute injection amount region determination unit determines that the total injection amount is within the minute injection amount region based on the total injection amount being less than or equal to a first predetermined fuel injection amount,
 the predetermined percentage is a ratio of the preceding injection amount to the total injection amount when the preceding injection amount is less than or equal to the fuel injection amount in the main injection, and
 the first predetermined fuel injection amount is the total injection amount when the fuel injection amount of the predetermined percentage of the total injection amount is less than or equal to a guaranteed minimum injection amount of the injector.

2. The injector control device according to claim 1,
wherein when the minute injection amount region determination unit determines that the total injection amount is not within the minute injection amount region, the injection amount setting unit sets, as the preceding injection amount, a predetermined fuel injection amount set in advance.

3. The injector control device according to claim 1,
the control such that the engine speed of the engine is in proportion to the load on the engine is one of a governor control and an idle speed control.

4. The injector control device according to claim 3,
the governor control is a control that sets the total injection amount using the governor map based on the engine speed and an accelerator position of the engine.

5. The injector control device according to claim 3,
the idle speed control is a feedback control that sets the engine speed to a predetermined value based on the engine speed and an accelerator position of the engine.

* * * * *